United States Patent Office 3,516,539
Patented June 23, 1970

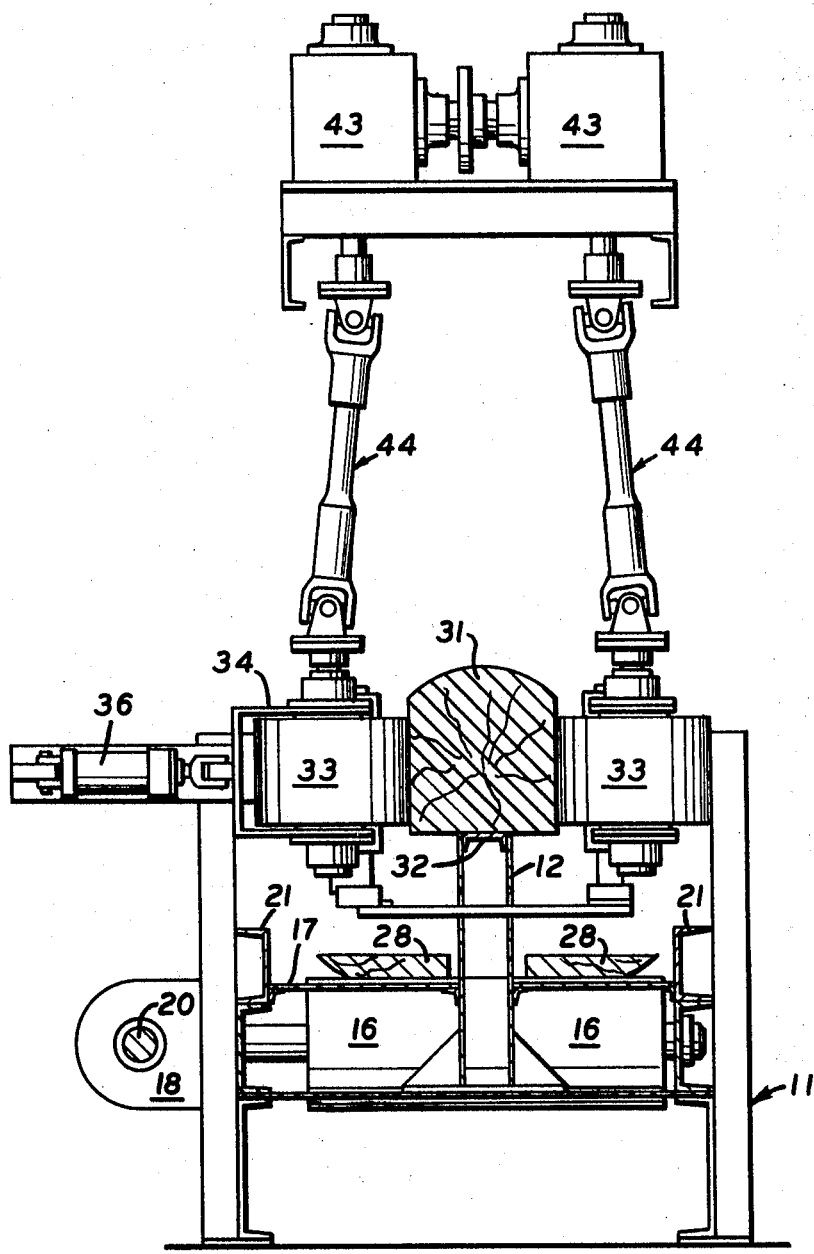

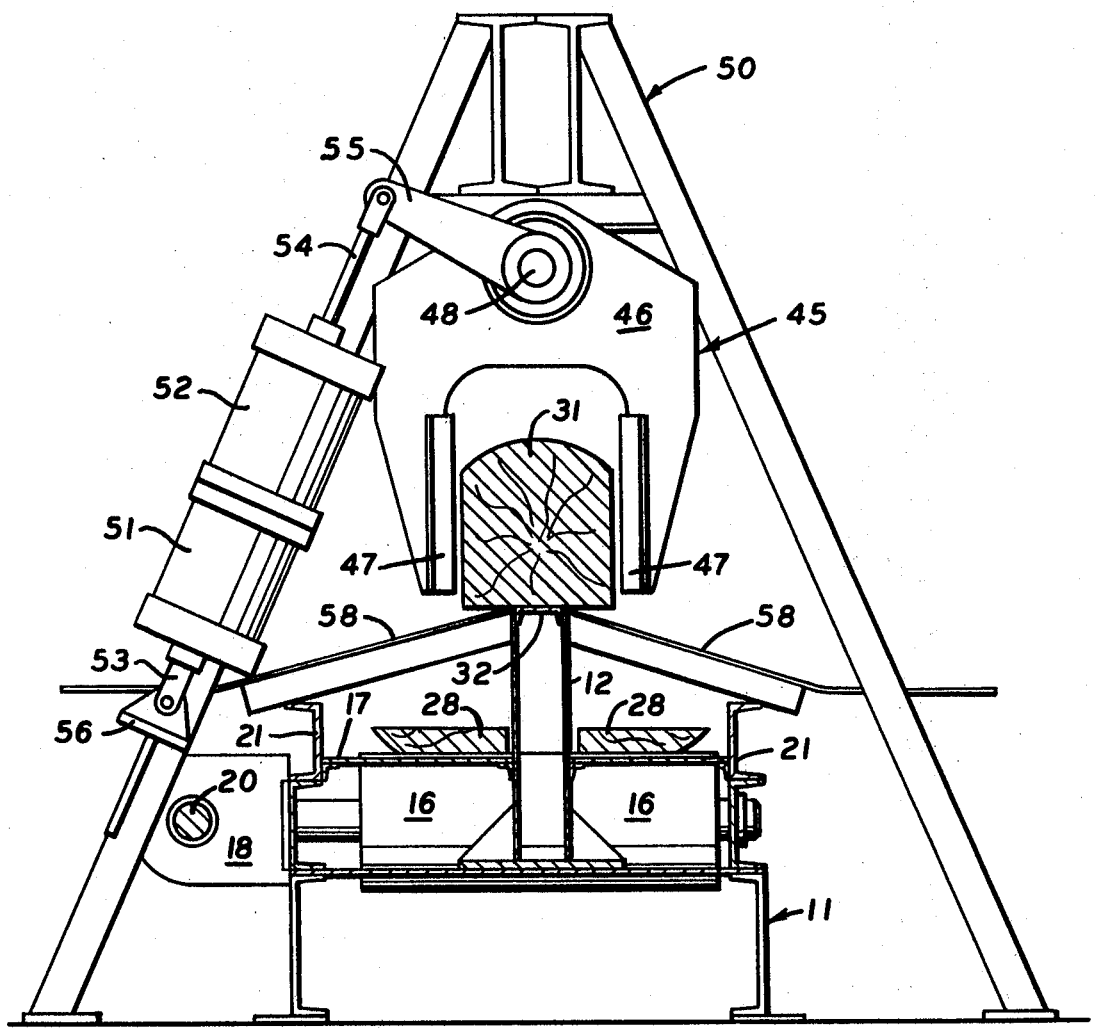

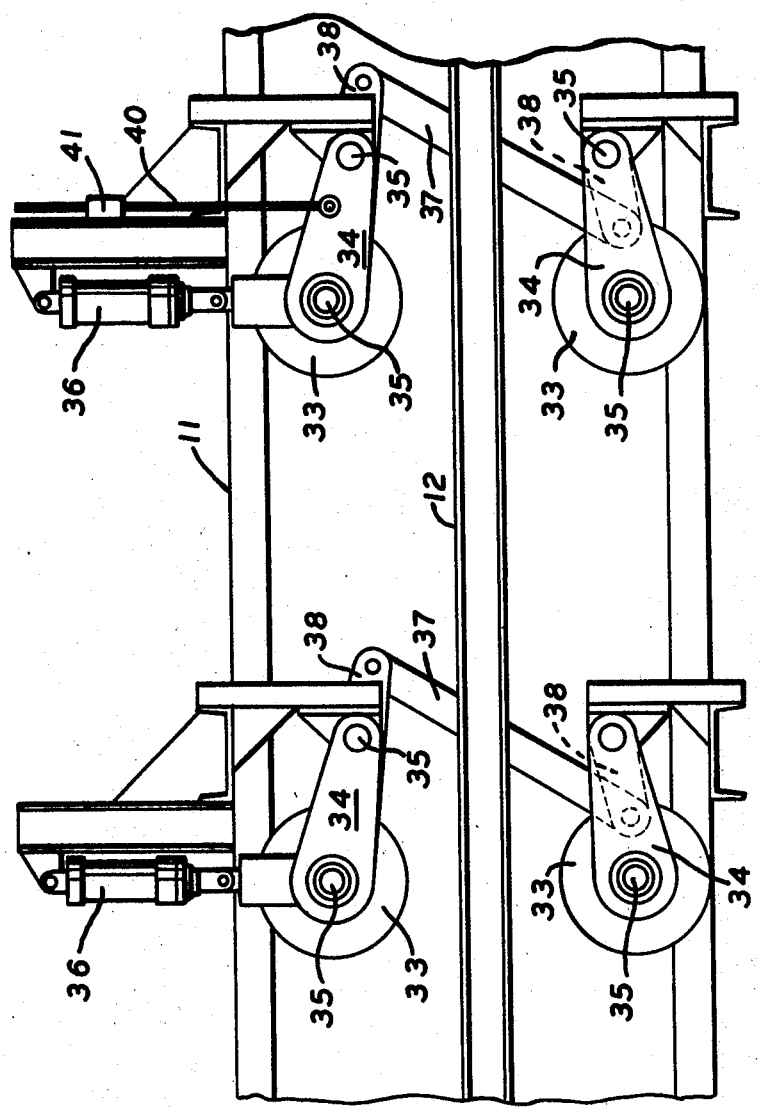

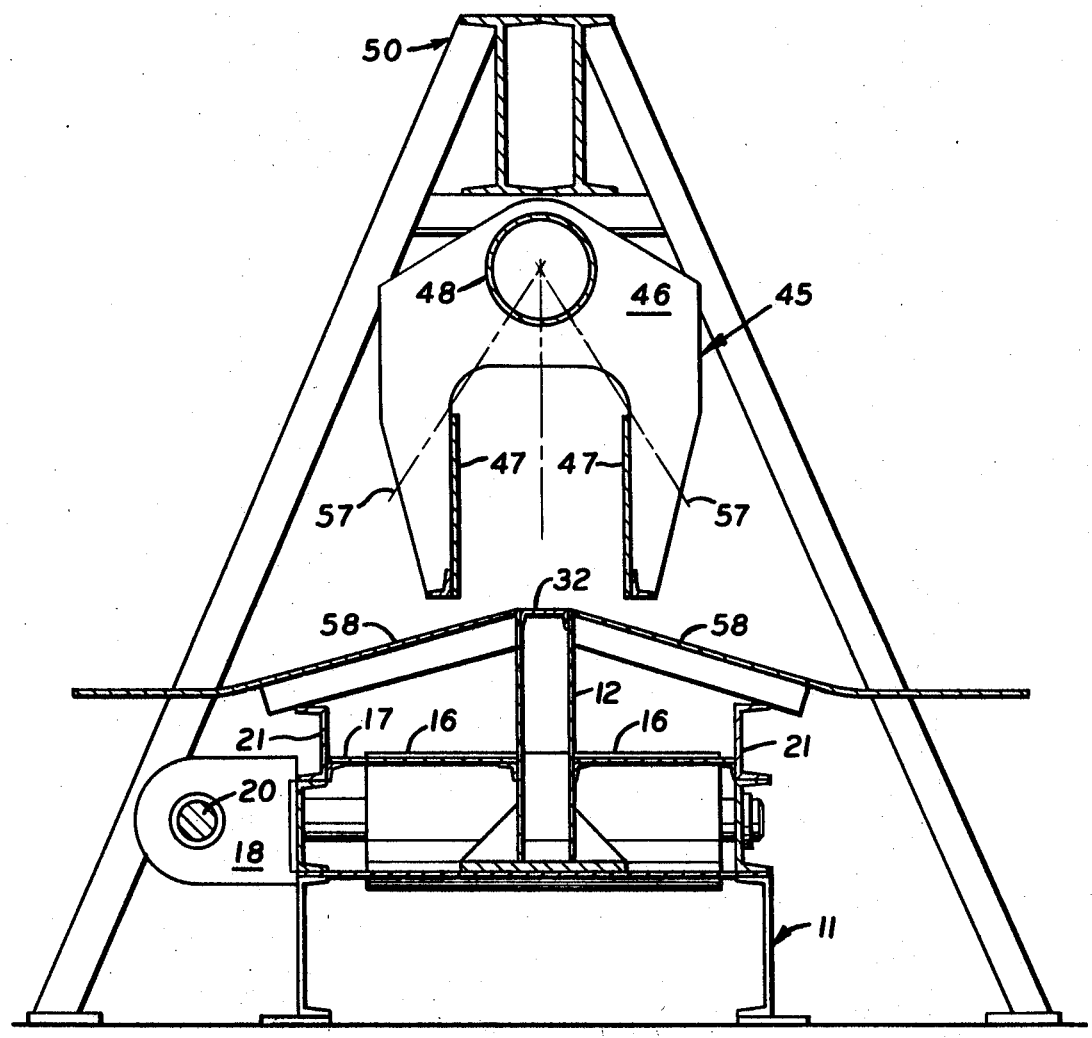

3,516,539
APPARATUS FOR SEPARATING AND HANDLING A CANT AND SIDEBOARDS
Richard R. Gulstrom, Lewiston, Idaho, and Gerald F. Scheelke, Clarkston, Wash., assignors to Potlatch Forests, Inc., Lewiston, Idaho, a corporation of Delaware
Filed May 13, 1968, Ser. No. 728,710
Int. Cl. B07c 5/06
U.S. Cl. 209—74                 10 Claims

ABSTRACT OF THE DISCLOSURE

An apparatus for separating a cant and sideboards wherein the sideboards are formed at opposite sides of the cant in a sawmill. The cant is conveyed in a straight line path by narrow conveying means. The sideboards are permitted to fall upon a lowered roll case extending parallel to the cant conveying means along both sides thereof. The cant is subsequently directed to a transverse shifting apparatus that throws the cant over the roll case carrying the separated boards. The cant is shifted to one side or the other, depending upon the size of the particular cant.

BACKGROUND OF THE INVENTION

This invention was developed to serve as the outfeed for an apparatus that chips the sides of wooden logs to produce two vertical outside surfaces parallel to one another, the squared log then being passed in a continuing path between two or more saws which cut rough boards along the sides of the resulting central cant. The nature of the cutting machinery is not of particular interest herein, since the cant and sideboards can be produced by various devices, including chipping heads, vertical band saws, circular saws, or any combination thereof. The instant apparatus is adapted to handle the cants and adjacent sideboards as they emerge from such sawmill equipment.

The development of chipping and multiple saw equipment makes possible the efficient handling of small diameter logs by squaring and cutting the logs in a continuous straight-line procedure. This is to be compared with prior devices which typically used a reciprocating carriage to hold a log as it was passed back and forth across an upright saw surface. In modern small log handling mechanisms, the log is processed in a single pass through the equipment, normally emerging as a central cant having squared side surfaces and one or more sideboards formed at oppoosite sides of the cant.

It is desirable to maintain the longitudinal flow of the cants and boards emerging from such equipment to insure the unobstructed exit of subsequent boards and cants. It is also desirable to permit sorting of cants by size, so that small width cants can be directed to an edger to be sawn into parallel boards, while larger cants can be directed to other mill equipment for additional processing. In the present apparatus the sideboards are moved longitudinally in paths parallel to the cant path, and the cants are subsequently shifted transversely across the path of the sideboards to one side or the other, depending upon cant size. The paths of both the sideboards and cants are unobstructed by one another, permitting high speed operation without requiring stoppage of any workpieces prior to selected transverse movement thereof.

SUMMARY OF THE INVENTION

The invention disclosed herein relates to a separating and handling apparatus for cants and sideboards including a first separating station at which the central cant is carried along narrow moving support means that conveys the cant in a selected path at a chosen elevation. The apparatus leaves the sideboards free to drop at both sides of the cant onto board conveying means which carries the boards at selected paths at a lower elevation relative to the path of the cants. A subsequent sorting station includes transverse shifting means for directing individual cants to one side or the other of the cant conveying means, the choice of direction being dependent upon the size of a particular cant.

It is a first object of this invention to efficiently separate and handle cants and sideboards cut therefrom while permitting the cants and sideboards each to continue in a longitudinal straight line movement after emerging from a sawmill apparatus. The continued longitudinal movement of the cants and boards eliminates difficulties encountered by change of direction adjacent to a sawmill apparatus.

Another object of this invention is to provide an apparatus which minimizes surface damage to the cant during conveying and shifting operations. The apparatus further includes protective plates that cover a portion of the board conveyor to insure against interference with board movement during transverse shifting of a cant across the board conveyor.

Another object of the invention is to provide an effective cant conveyor using vertical side rolls to engage a cant being directed to the shifting apparatus, these rolls serving also to register the width of each cant within chosen limits, providing a width gauge for control of the transverse shifting apparatus. These and further objects will be evident from the following disclosure, together with the accompanying drawings which illustrate a preferred form of the apparatus. It is to be understood that the disclosure in the drawings is somewhat simplified, but illustrates the basic relationship of the elements discussed herein. The invention summarized above is set out in the claims at the conclusion of the disclosure.

BRIEF DESCRIPTION OF THE DRAWINGS

FIG. 6 is an enlarged cross sectional view taken along line 6—6 in FIG. 2;

FIG. 7 is an enelarged cross sectional view taken along line 7—7 in FIG. 2;

FIG. 8 is an enlarged horizontal sectional view taken along line 8—8 in FIG. 2 with the rollers in retracted condition; and FIG. 9 is an enlarged cross sectional view taken along line 9—9 in FIG. 2.

PREFERRED EMBODIMENT OF THE INVENTION

The apparatus disclosed herein can basically be broken into two main subgroups, each of which is designed for maximum effective utilization of the other. The first is a separating station, shown in FIGS. 1, 3 and 5, which separates the sideboards from the central cant. The cant is permitted to continue its longitudinal movement along a selected path as the sideboards drop to a lowered roll case for longitudinal movement along paths parallel to the cant path. The second subgroup comprises a sorting station, shown in FIGS. 2, 4 and 6 through 9, at which the cant size is registered and each cant is transferred transversely across the board conveyors, the direction of transfer being selected according to the size of the particular cant. The transverse shift of each cant occurs without interfering with the continued longitudinal movement of the boards.

In the following description, it is to be understood that the path of the movement of both the cants and boards as illustrated in FIGS. 1-4 occurs from left to right, and various elements will be described with reference to this direction of movement, the forward direction being to the right in these drawings. It is also to be understood that the common supporting framework will normally be mounted on a floor or other supporting surface with the cant and board conveyors normally in a horizontal position, although this disclosure is not to be so limited.

Figure 1:
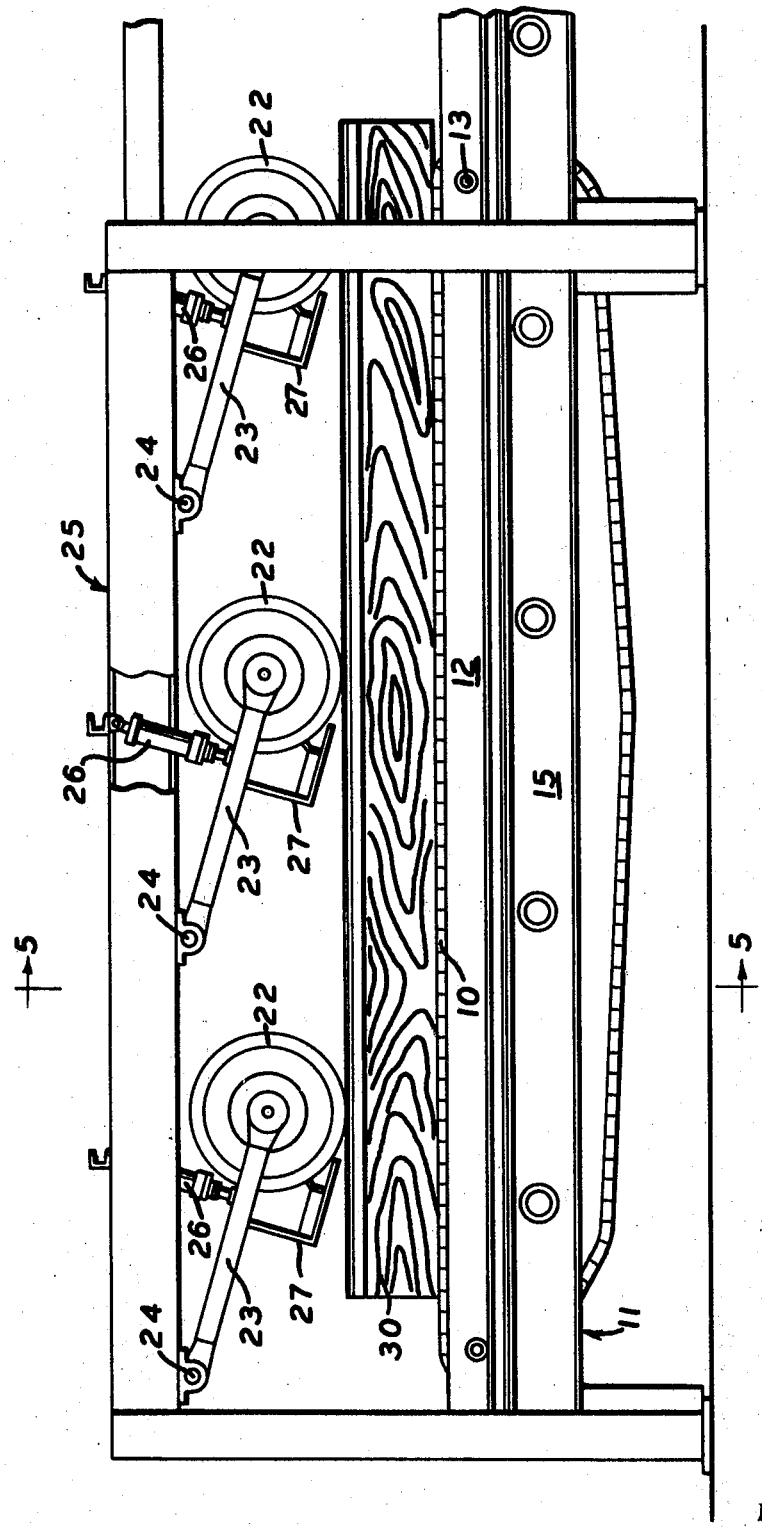
FIG. 1 is a side elevation view of the separating station in the present apparatus.
Figure 3:
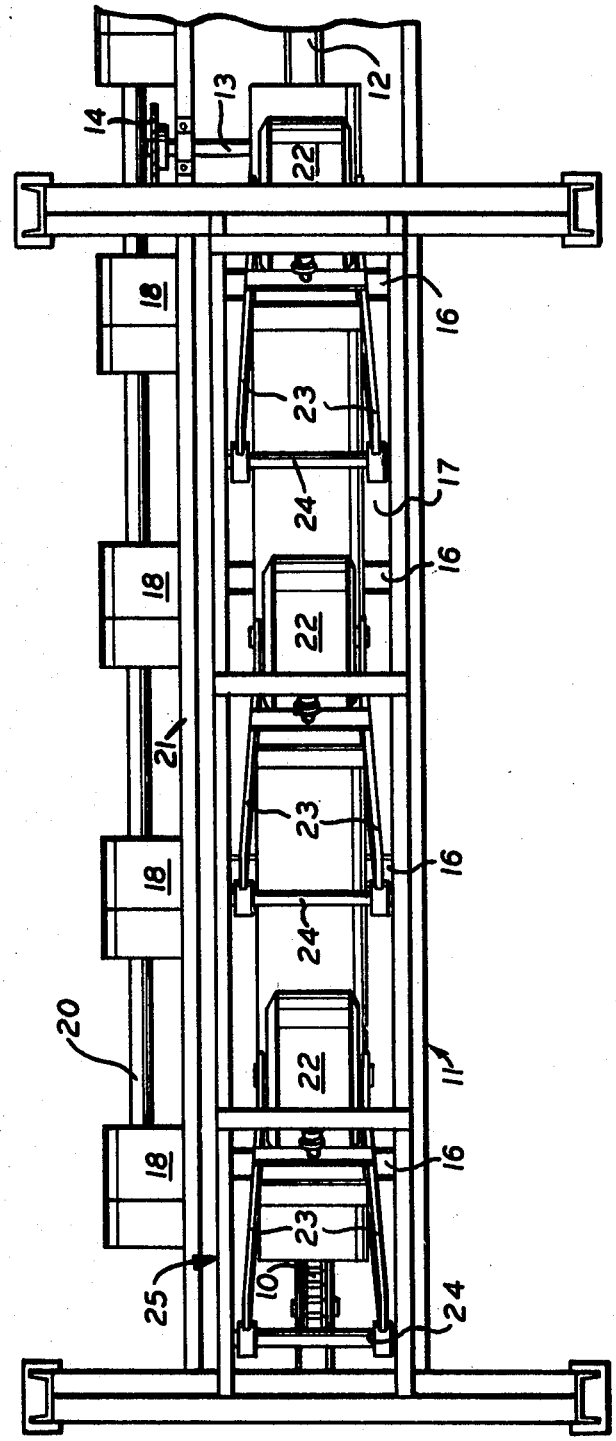
FIG. 3 is a top view of the apparatus shown in FIG. 1.
Figure 4:
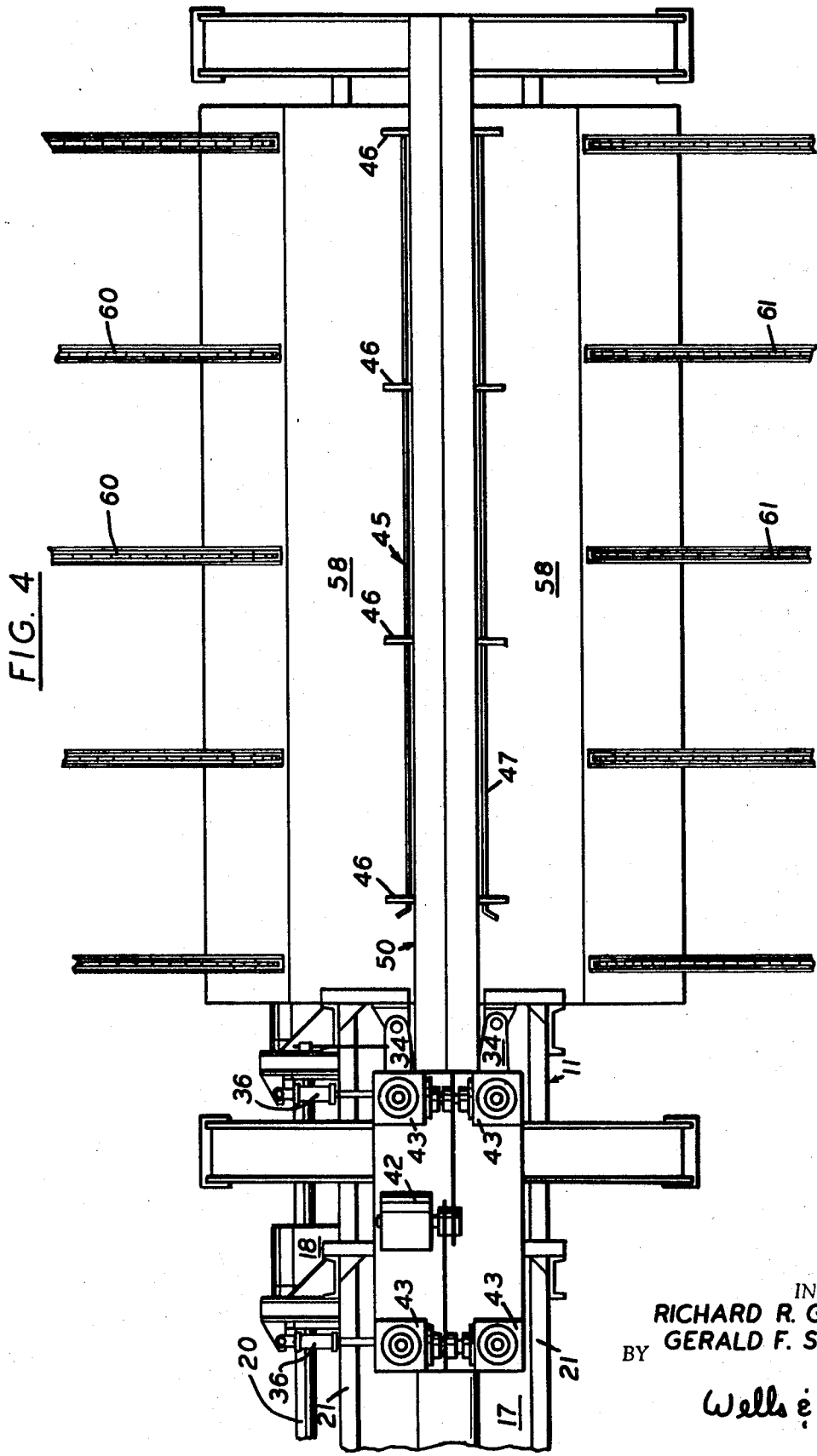
FIG. 4 is a top view of the apparatus shown in FIG. 2.

Rearward or to the left of the separating station shown in FIGS. 1 and 3 is sawmill machinery which squares the sides of logs by chipping or sawing, and which cuts one or more sideboards at opposite sides of the central cant. These emerge in their initial positions as cut relative to the original log, and enter the apparatus at the left in FIGS. 1 and 3 as abutting but unconnected wooden members. The nature of the mill equipment which produces the cant and boards is not limited to any particular device and may include any desired combination of chipping heads, band saws, circular saws, or the like (not shown).

The apparatus at the separating station includes cant conveying means for guiding and supporting the bulky central cant produced from the log. Preferably, the cant conveying means is in the form of a narrow support means at the underside of the cant, such as the longitudinal outfeed chain 10 (FIG. 1). Chain 10 is extended along a supporting framework 11, which includes a longitudinal cant support structure 12 that extends centrally throughout the present apparatus. Chain 10 is moved by a forward sprocket connected to a transverse power shaft 13 which is rotated by a driving sprocket 14 connected to a suitable source of conveyor power. The upper flight of chain 10, which frictionally engages the lower surface of a cant 30 as shown, moves from left to right in a forward direction and the chain 10 is normally continuously powered to provide such movement.

Figure 5:
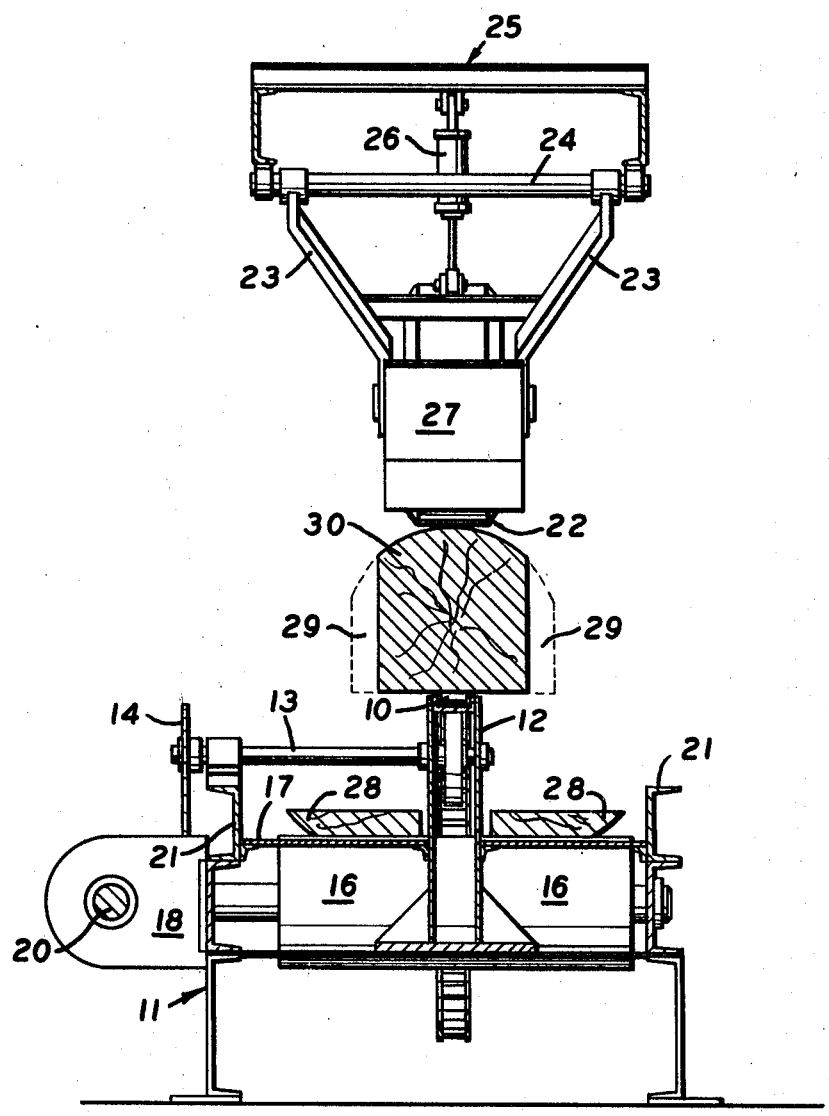
FIG. 5 is an enlarged cross sectional view taken along line 5—5 in FIG. 1.

Board conveying means is provided at each side of the cant conveying means to receive the sideboards, which are free to fall from the sides of the cant supported on the chain 10. Referring to FIG. 5, the sideboards are indicated by the numeral 28 and their original positions relative to cant 30 are shown by dashed lines in the areas indicated at 29.

The board conveying means comprises a conventional roll case 15 including longitudinally spaced transverse rolls 16 rotatably carried by the framework 11. A continuous table surface 17 spans the spaced rolls 16, the table surface 17 being apertured to receive the slightly elevated upper surfaces of the respective rolls 16. The rolls 16 are powered by gear boxes 18 located along framework 11 and operatively connected to one another by a driving shaft 20. The rolls 16 are driven in unison to support and propel boards 28 longitudinally along board paths parallel to and elevationally below the path of the cants on the cant support 12. The boards on the roll case 15 move between the smooth upright surfaces of the cant support 12 at the center and side channels 21 at each side of the apparatus, which coact to guide the boards for longitudinal movement and to prevent individual boards from being turned from the selected straight line path.

Stabilizing means is provided above the chain 10 to assist in holding the cants during movement and to prevent them from tipping to the side on the narrow support means. The stabilizing means is in the form of wheels 22 rotatably journalled about transverse axes. Each wheel 22 is elevationally adjustable by means of a pair of support arms 23 pivotally connected at 24 to an overhead arch 25 (FIG. 1). Each wheel 22 is elevationally located relative to the chain 10 by hydraulic positioning cylinders 26 operatively connected between the arch 25 and the support arms 23; cylinders 26 being adapted to accommodate cants of various heights. Protective skids 27 are mounted on the support arms 23 immediately rearward of each wheel 22 to assist in minimizing the shock loading of a wheel 22 when first engaged by the forward end of a cant.

The continuously moving chain 10, in conjunction with the stabilizing wheels 22, serves to move each cant in a straight line path that is a continuation of its original path when entering the instant apparatus. At the same time, the sideboards 28 are free to gradually fall upon the roll case 15, where the respective boards at each side of the cant will travel along the rolls 16 in paths parallel to the cant path, but elevationally below it. This provides effective separation of the cant and sideboards, and permits each to be handed independently of the other, as will be discussed below.

After emerging from the forward ends of the outfeed chain 10, each cant is directed to the sorting station, where the cant is directed to one side or the other of its original longitudinal path. The cant is propelled by engagement of its side surfaces by side rollers 33. The cant is vertically supported forward of chain 10 by a smooth support plate 32 along the upper surfaces of the cant support 12. The rollers 33 and plate 32 minimize damage to the cant surfaces, particularly when the speed of the cant is increased. Specifically, the chain 10 feeds the forward end of each cant between the four rollers 33, and the rear end of each cant is just free of chain 10 when the cant is drivingly engaged by the rollers 33.

Each roller 33 is rotatably mounted about a vertical axis by mounting arms 34 pivotally connected about shafts 35 on framework 11. A pair of positioning cylinders 36 are operatively connected between the mounting arm 34 and one side of the apparatus and the framework 11 to selectively move each roller 33 inward or outward relative to the center line of the cant path on the support 12. A transverse connecting link 37 extends beneath the support plate 32 across the apparatus, being pivotally connected at its respective ends to cranks 38 which pivot in unison with the respective mounting arms 34 about the axes of shafts 35. Identical but opposite transverse movement is therefore imparted to the respective paired rollers, bringing them inward or outward an equal distance in response to operation of cylinders 36.

The amount of travel of the rollers 33 toward or away from the center line of the cant path will naturally be related to the width of the particular cant being engaged. To provide a register of this width, a rod 40 is pivotally mounted on one of the mounting arms 34 (FIG. 8) and is operatively connected to a limit switch 41 on the framework 11. The purpose of rod 40 is to register cant width below or above a chosen limit, so as to trip the switch 41 when the rollers 33 move inward a chosen distance. This is used as part of the control for the transverse shifting means described below.

The rollers 33 are powered by a suitable motor 42 and gear boxes 43 at the upper ends of universal driving connections 44 operatively connected between the gear boxes 43 and the respective rollers 33. The details of these driving mechanisms are well known in this field and further particulars are believed unnecessary to an understanding of this disclosure.

Figure 2:
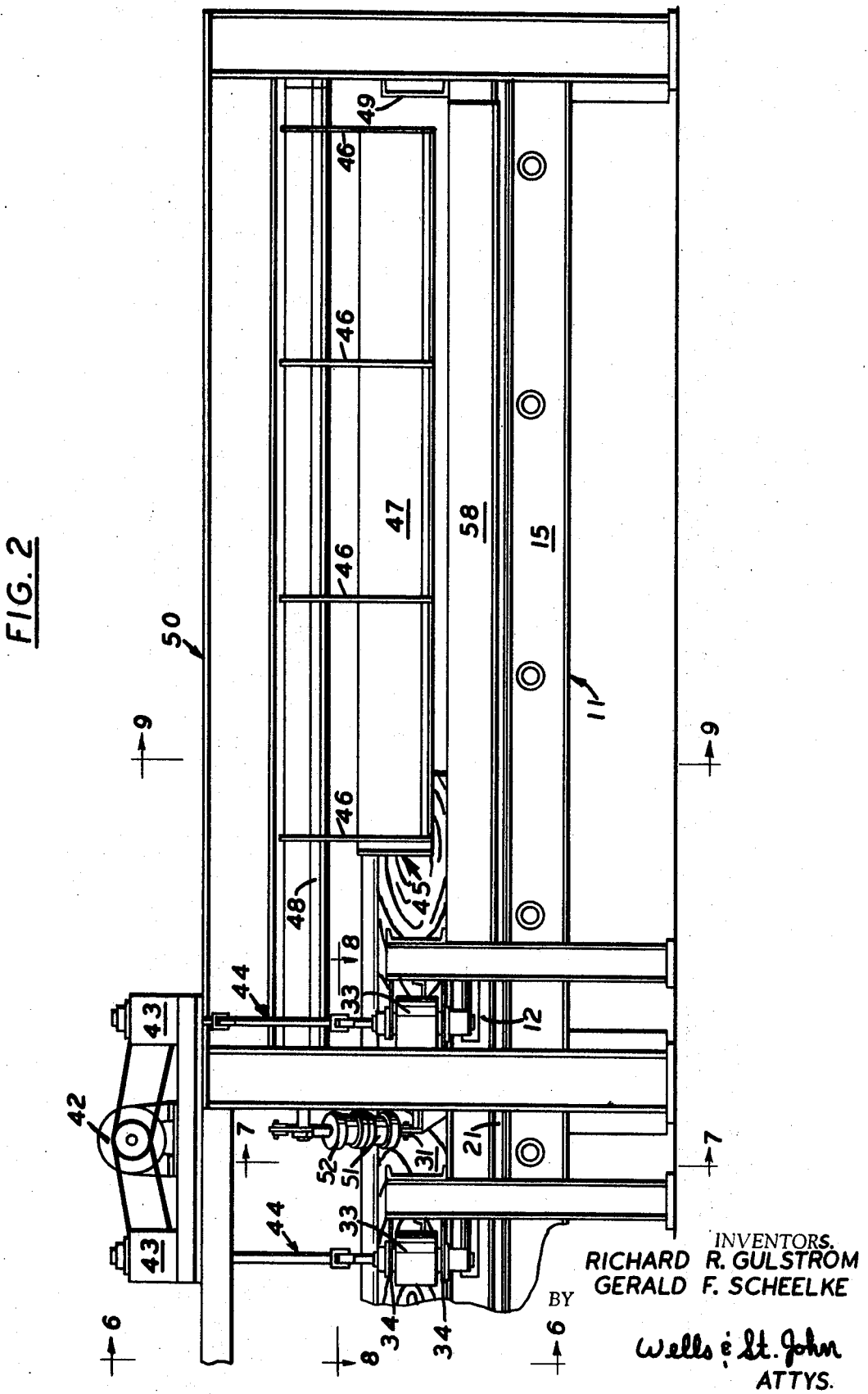
FIG. 2 is a side elevation view of the sorting station in the apparatus.

The transverse shifting means can best be understood by a study of FIGS. 2, 7 and 9. It includes a longitudinal flipper 45 within which each cant is received. As shown in FIG. 2, a cant 31 is illustrated in engagement with the rollers 33 and partially received within the flipper 45. Its forward movement will continue until its front end comes to rest against a transverse abutment 49 (FIG. 2). It will then be substantially within flipper 45, which is operated to cause the cant 31 to be shifted transversely to one or the other side of the original cant path.

The flipper 45 is a unitary structure comprising a series of U-shaped ribs 46 spaced longitudinally from one another and positioned in transverse planes. The ribs 46 support parallel side plates 47 that provide continuous inside surfaces for engagement with the sides of a cant. The plates 47 also prevent the cant from falling to one side or the other of the cant support 12 after the rear end of a cant is free of rollers 33.

The ribs 46 are fixed to a longitudinal pivot shaft 48 journalled on a supporting arch 50 fixed to the supporting framework 11. The shaft 48 is selectively pivoted by dual hydraulic cylinders 51, 52 (FIG. 7) fixed back to back. The piston rod 54 of the upper cylinder 52 is normally extended and has its outer end pivotally connected to a crank arm 55 fixed to shaft 48. Piston rod 53 of the lower cylinder 51 is normally retracted and has its outer end pivotally connected to an anchor 56 on the framework 11. By selective retraction of the rod 54 or extension of rod 53, the shaft 48 is pivoted to shift a cant to one side or the other of the cant support 12. The extreme positions of flipper 45 are illustrated in FIG. 9 by center lines designated at 57.

Since the cant engaged by flipper 45 will be thrown across the roll case 15, protective plates having inclined surfaces 58 extend continuously along the length of flipper 45 and outwardly overlying the paths of the boards to guide cants to the sides and to prevent a cant from interfering with the movement of boards along the respective board paths. The inclined surfaces 58 direct the cants onto cant receiving chains 60 or 61, which extend transversely outward to each side of the sorting station.

In its intended application, the present apparatus is used to first separate the boards from the cant and permit the boards to continue their longitudinal movement along transversely separated paths parallel to their original paths when emerging from the cutting apparatus. The paths of the boards at each side of the cant path can converge downstream or forwardly of the sorting station discussed above. In addition, where cants of substantial size variation are encountered, it is advisable to separate smaller cants from larger cants. The smaller cants can be fed directly to multiple saw edgers to be cut into a plurality of boards in one operation. The larger cants can be directed to other sawmill facilities capable of handling their bulk. As an example, in the present apparatus cants below a chosen size as registered by limit switch 41 can be directed onto the upper chain 60 shown in FIG. 4 while cants having a size greater than the chosen size can be automatically transferred to the opposite size of the original cant path and engaged by chains 61.

Various modifications might be made in the device disclosed without deviating from the concepts of the apparatus. It is to be understood that conventional control equipment can be applied to automatically direct the operations discussed, or that these operations can be controlled manually if desired. For these reasons, only the following claims are intended as definitions of the invention disclosed herein.

Having thus described our invention, we claim:

1. An apparatus for separating and handling a cant and sideboards produced by a mill and longitudinally fed to the apparatus at a selected elevation, comprising:
   (a) a cant conveying means for supporting only the cant and moving the cant longitudinally forward in a selected cant path at the selected elevation;
   (b) a board conveying means positioned below and to the sides of the cant conveying means for receiving the boards at a lower elevation and conveying the sideboards forward in selected board paths at the lower elevation parallel to the cant; and
   (c) transverse shifting means for laterally moving the cant across the path of one of the sideboards without interrupting the flow of the sideboards.

2. An apparatus as defined in claim 1 wherein the cant conveying means includes a narrow moving support means that has a width that is less than the width of the cant.

3. An apparatus as defined in claim 2 wherein the cant conveying means includes a stabilizing means engaging the top surface of the cant to maintain the cant on the narrow moving support means.

4. An apparatus as defined in claim 3 wherein the stabilizing means includes downwardly biased wheels vertically aligned with the narrow moving support means.

5. An apparatus as defined in claim 1 wherein the transverse shifting means includes laterally movable parallel side plates straddling said cant path for receiving a cant therebetween and for laterally pushing the received cant from the longitudinal path.

6. An apparatus as defined in claim 5 further comprising sizing means for measuring the width of the cant after the boards are separated from the cant and wherein the transverse shifting means is responsive to the sizing means for pushing cants having widths greater than a predetermined distance in one lateral direction and for pushing cants having widths less than said predetermined distance in the opposite lateral direction.

7. An apparatus for separating and handling a cant and sideboards produced by a cutting mill and longitudinally fed to the apparatus at a selected elevation, comprising:
   (a) a separating station for receiving and separating the sideboards from the cants, comprising:
      (1) a cant conveying means for supporting only the cant and moving the cant forward in a selected path at the selected elevation;
      (2) a board conveying means positioned below and to the sides of the cant conveying means for receiving the boards at a lower elevation and conveying the sideboards forward in selected paths at the lower elevation parallel to the cant; and
   (b) a cant sorting station having transverse shifting means for moving the cant from the selected cant path laterally across the path of one of the sideboards without interrupting the flow of the sideboards in one lateral direction or the other depending upon the width of the cant.

8. An apparatus as defined in claim 7 wherein the cant sorting station has two inclined surfaces extending laterally in opposite directions from the selected cant path over the board paths and wherein the transverse shifting means includes two movable parallel side plates normally straddling said cant paths for receiving a cant therebetween and for laterally pushing the cant in one lateral direction or the other depending upon the width of the cant and onto one of the inclined surfaces for movement across the path of one of the boards.

9. An apparatus as defined in claim 8 further comprising a drive means having spaced interconnected side rollers mounted between the separating station and the sorting station for engaging the sides of the cant to propel the cant from the separating station to the sorting station between the two parallel side plates and a width measuring device operably connected to the side rollers for measuring the width of the cant engaged by the side drive rollers.

7

10. An apparatus as defined in claim 8 wherein the cant conveying means includes a narrow conveyor that has a width less than the width of the cant for supporting and moving only the cant and a stabilizing means mounted above the narrow conveyor for engaging the top surface of the moving cant to maintain the cant on the narrow conveyor and wherein further the board conveying means includes conveying surfaces positioned at the lower elevation and to both sides of the narrow cant conveyor for receiving the boards as they fall from the selected elevation and moving the boards forward.

References Cited
UNITED STATES PATENTS

| | | | |
|---|---|---|---|
| 2,876,815 | 3/1959 | Rogers | 209—82 X |
| 3,138,258 | 6/1964 | Stupfel et al. | 209—82 |
| 3,456,700 | 7/1969 | Ahlstedt | 209—82 X |

ALLEN N. KNOWLES, Primary Examiner

U.S. Cl. X.R.

198—27; 209—88